Aug. 5, 1952 — E. S. BAKER — 2,606,310
CAPACITANCE PICK-OFF SERVO SYSTEM
Filed April 6, 1950 — 2 SHEETS—SHEET 1

INVENTOR:
EDWARD S. BAKER
BY Herbert E. Metcalf
HIS PATENT ATTORNEY

Aug. 5, 1952 — E. S. BAKER — 2,606,310
CAPACITANCE PICK-OFF SERVO SYSTEM
Filed April 6, 1950 — 2 SHEETS—SHEET 2

INVENTOR:
EDWARD S. BAKER
BY Herbert E. Metcalf
HIS PATENT ATTORNEY

Patented Aug. 5, 1952

2,606,310

UNITED STATES PATENT OFFICE 2,606,310

CAPACITANCE PICK-OFF SERVO SYSTEM

Edward S. Baker, Los Angeles, Calif., assignor to Northrop Aircraft, Inc., Hawthorne, Calif., a corporation of California Application April 6, 1950, Serial No. 154,249

6 Claims. (Cl. 318—31)

This invention relates to deviation sensing systems and more particularly to a capacitance-type pick-off circuit for detecting deviations of a rotating member from a null setting.

In the control of guided missiles, for example, where a gyro is utilized to indicate or control direction, it is desirable to mount the gyro so as to be, in effect, free in inertial space and use the orientation thus assumed by the gyro spin axis as a directional reference. For the case when the gyro is to be used for an azimuthal reference, the gyro is positioned with its spin axis normally in a horizontal plane pointing in the predetermined direction. More specifically it is preferred to mount the gyro in a case and to journal the gyro case to rotate in a gimbal on a horizontal axis at right angles to the spin axis. The gimbal is then mounted to rotate on a vertical axis in a main frame attached to a platform which is maintained substantially horizontal by other means and is mounted in the craft.

In operation, it is desired that the main frame be slaved to follow the direction of the spin axis of the gyro, hence a deviation sensing pick-off system is desired which will sense the relative motion between the gimbal and main frame and provide appropriate signals which may be utilized, for example, to rotate the supporting platform to the spin axis direction. Thus the supporting platform is continually made to follow and to be in line with the direction of the spin axis of the gyro.

The slaving circuit for sensing the relative motion of the spin axis with the platform must not introduce any significant torques into the system as this will cause spurious torques about the gyro case journals, for example. Hence it is an object of this invention to provide a suitable capacitatively sensing pick-off circuit, thereby eliminating any substantial sensing torques.

It is another object of this invention to provide a position sensing circuit which will give a signal indicating the direction and proportional to the magnitude of the deviation of a member from a null.

The circuit of the present invention is shown but not claimed in the copending application of Bruce E. Dixson, Serial No. 99,651, filed June 17, 1949.

Broadly, the present invention comprises a capacitative bridge having the capacitors in two adjacent legs formed from a common rotor coacting with a pair of stators located in each of the legs. The rotation of the common rotor, with respect to the stators, causes unbalance in the capacitance bridge. The bridge is energized by a fixed tuned frequency which is applied through a tuning circuit connected across diagonally opposite terminals of the bridge. Depending on the value of the capacitative unbalance, the bridge gives an A. C. signal output across its other pair of diagonally opposite terminals. The amplitude of the output A. C. signal is a function of the unbalance of the bridge, and, furthermore, has a phase shift with respect to the reference frequency. By impressing the amplified reference frequency and the phase shifted signal through individual tuned circuits coupled to a standard ring demodulator circuit, a D. C. signal can be detected which is proportional to the amount and sense of relative rotation of the common rotor with respect to the pair of stators in the bridge.

Figure 1:
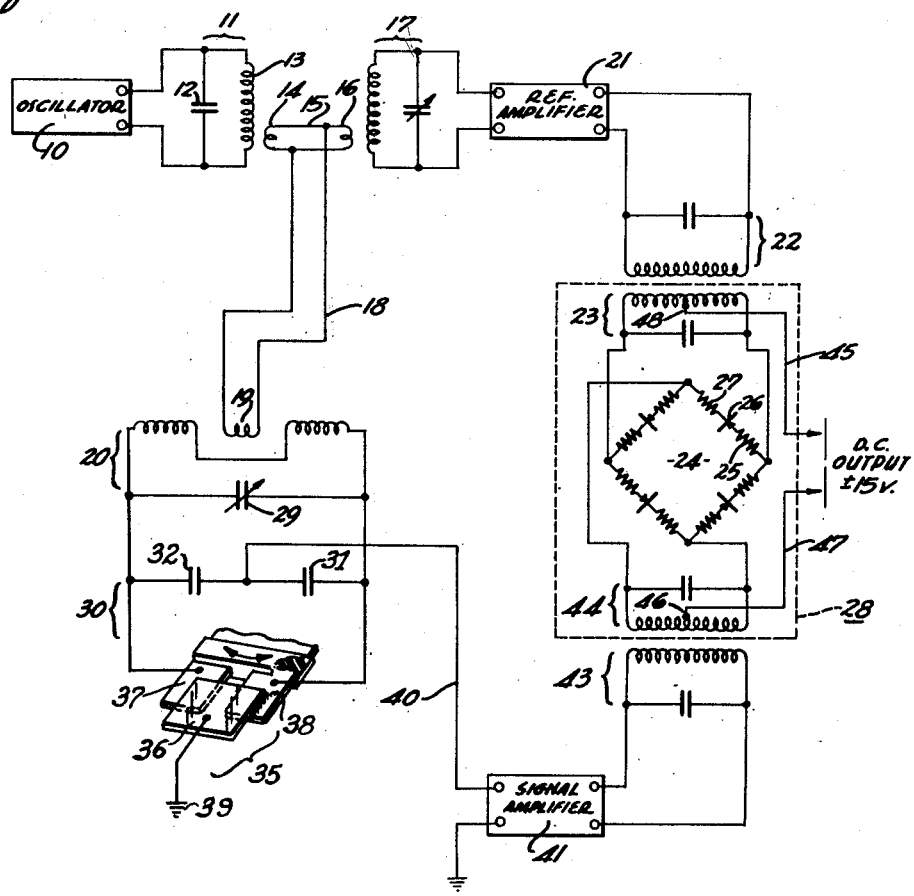
Figure 1 shows a circuit diagram of a preferred embodiment of the invention.

Referring first to Figure 1, a constant frequency oscillator 10 is provided for energizing the preferred embodiment of the sensing circuit of the present invention. Oscillator 10 feeds its sinusoidal output to an oscillator tuning circuit 11 comprised of a capacitor 12 in parallel with an inductance coil 13. Coupled to one end of inductance coil 13 is a small link coil 14 located in a link circuit 15. Also in link circuit 15 is a small reference link coil 16 which is similarly coupled to the coil of first reference tuning circuit 17. Connected across link coil 14 is a second link circuit 18 having a small signal link coil 19 therein which is coupled to the center portion of the coil of a first signal tuning circuit 20.

It is to be noted that this method of link coupling the oscillator tuned circuit 11 to the reference tuning circuit 17 and the signal tuning circuit 20 is highly advantageous since it minimizes back electromotive forces from adversely affecting the energy transfer.

The fixed frequency sinusoidal output from the first reference tuning circuit 17 is fed through a reference amplifier 21 to a second reference tuning circuit 22 which is coupled to a third reference tuning circuit 23. This last tuning circuit then has its output directly connected across diagonally opposite terminals of a diode ring 24. Each leg of diode ring 24 is made up of resistors, like 25 and 27, serially connected on each side of a diode, like 26, in a conventional manner. The diode ring 24 and the associated tuning circuits 23 and 44 are well known as a standard ring demodulator circuit 28.

The output from the first signal tuning circuit 20 has its terminals connected across a capacitance bridge network 30. This bridge network is comprised of fixed external capacitors 31 and 32, each hooked up in one of two adjacent legs, and a gang capacitor 35 formed by a common rotating capacitor member 36 co-acting with stationary members 37 and 38 disposed in each of the other legs of the bridge network. The rotating capacitor member 36 is grounded at 39.

The output lead 40 from the bridge network 30 is taken from the common terminal between the two fixed external capacitors and fed through a signal amplifier 41 where the signal is amplified and fed into a second tuned signal circuit 43 coupled to a third tuned signal circuit 44. This latter tuned signal circuit is connected to the remaining pair of diagonally opposite terminals of the diode ring 24.

The outputs lines from the sensing circuit comprise a reference output line 45 connected to the mid-point 48 of the inductance coil of the third reference tuned circuit 23, and a signal output line 47 connected to the mid-point 46 of the inductance coil of the third signal tuned circuit 44.

In operation, the frequency and phase of the wave form through the reference circuit remains constant. This same reference frequency is applied through link coil 19 to the signal tuning circuit 20. However, in this latter tuning circuit, variable capacitor 29 is set so that it is slightly untuned to the reference frequency. It should be noticed that it is the additional capacitance obtained by the unbalancing of the capacitance bridge network 30 that enables signal tuning circuit 20 to resonate at the reference frequency. Thus, the output of the bridge network 30 is at reference frequency. However, the amplitude changes; and the phase of the signal output wave form from the bridge, with respect to the reference waveform, is shifted when the effective areas of the stationary members 37 and 38 of variable capacitor 35 are varied by rotation of common capacitor member 36. The voltage output, across the two output lines 45 and 47, is a D. C. voltage which varies from a minimum to a maximum in either direction as the rotary capacitance member 36 varies from a null position to a maximum position on either side of its balancing null position.

When the bridge capacitance network 30 is in a null condition, i. e., the effective capacitance at 37 is set to equal the effective capacitance at 38, the output from the bridge circuit is zero and a minimum output at the mid-point 46 of third signal tuned circuit 44 is realized, thereby giving a zero D. C. output signal across output lines 45 and 47.

If, for example, the effective capacitance at 37 increases from a null value (it is to be noted that the effective capacitance at 38 would decrease a proportional amount), the bridge network 30 will cause the signal tuning circuit 20 to begin resonating and the signal voltage output at mid-point 46 will increase.

The increase of the effective capacitance at 37 also causes a phase shift in the output frequency of the signal circuit, with respect to the output frequency circuit, thereby causing, for example, the D. C. voltage increase across the output lines 45 and 47 to be in a negative direction.

If the effective capacitance at 38 should now be increased from a null position, the bridge circuit 30 would unbalance and cause an increase in output voltage at mid-point 48, similar to the operation outlined above; however, the bridge circuit 30 causes an opposite phase shift in the signal circuit for this case such that the increase in the D. C. output signal voltage is now in a positive direction.

Thus, the sensing circuit as shown will determine the direction and amount of movement of the rotary capacitance member 36 with respect to the stator capacitor members 37 and 38 in the bridge circuit.

Figure 2:
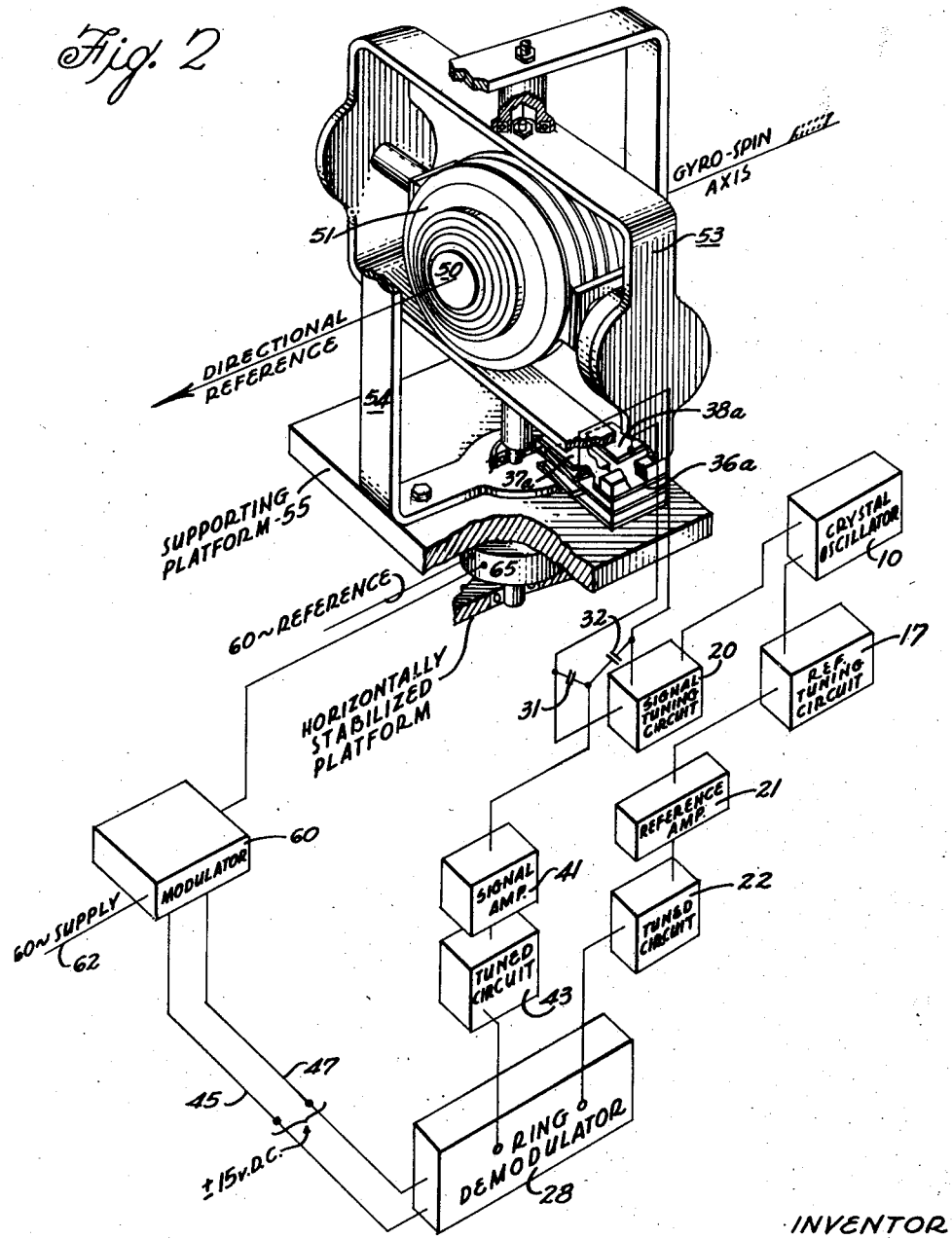
Figure 2 shows a gyroscopic assembly arranged to utilize the circuit of Figure 1.

Referring next to Figure 2, a gyro assembly set-up is shown making use of the circuit of the present invention.

Here, gyro 50 is shown to be mounted in a case 51. The horizontally disposed spin axis of the gyro is indicated by an arrow. The gyro case is journalled in a gimbal 53 on a horizontal axis at right angles to the spin axis of the gyro. The gimbal 53 is then mounted to rotate on a vertical axis in a main frame 54 attached to a supporting platform 55 which is maintained substantially horizontal by other means, not shown.

A stack of rotor blades 36a is attached to the lower position of gimbal 53. This stack extends downwardly with the blades horizontal, and a pair of spaced stacks of stator blades 37a and 38a are mounted on platform 55 with the rotor blades 36a only barely interleaving both stacks of stator blades at the neutral position of the gimbal 53. Rotation of the gimbal will thus increase the capacity of one or the other stacks of stator blades.

The capacitance assembly forms a ganged capacitor which cannot introduce any significant torques to the gyro. The two stator halves 37a and 38a of the gang capacitance, which are effectively attached to the supporting platform 55, are interconnected, as shown in Figure 2, with external fixed capacitors 31 and 32 to form the bridge network previously described. In order to make the bridge properly operative, the size of the capacitors is such that the capacitance formed by stator half 37a and stator half 38a, at the desired null position of the supporting platform 55, is equal to the individual capacitances of the external capacitors 31 and 32. The crystal oscillator 18, tuned to a high frequency, for instance to approximately 1 mc., is connected, as before indicated, to energize both the reference tuning circuit and the signal tuning circuit.

With the two stator halves of the gang capacitor, attached to the supporting platform 55; and the common rotor 36, attached to the gimbal 53, any directional deviation between the established spin axis of the gyro and the supporting platform 55 results in an unbalance in the capacitance of the bridge circuit and results in a proportional signal to the signal amplifier 41. Depending on which of the two halves stator 37a and 38a of the gang capacitor has the greater effective area, the output A. C. signal from the bridge network has a phase relationship with respect to the crystal oscillator frequency, so that it either leads in phase, or lags in phase with this reference frequency.

The ring demodulator 28, which is a conventional circuit, detects the amplitude of the signal and its phase relation with the reference. The sense of the D. C. output appearing in the signal and reference output leads 47 and 45 thus is a function of the direction of deviation of the support platform with respect to the gyro spin axis.

A modulator 60 employs this D. C. voltage output to control and amplify a 60 cycle supply voltage which is fed into modulator 60 on a supply line 62. The phase lead or lag relationship of the modulator output to this reference frequency is determined by the sense of the D. C. voltage output of the modulator. This 60 cycle voltage is then properly imposed on the control field of a platform torque motor 65, connected to rotate supporting platform 55. The reference field of the torque motor 65 is energized by the reference frequency supply line 62. Thus, the unbalance in the capacitance of the bridge circuit results in an appropriate signal which is used to slave the supporting platform 55 to the null directional position referenced by the gyro in its free state.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In a deviation signal circuit, an oscillator having a fixed frequency output, a ring demodulator circuit, coupling circuits for applying said fixed frequency to said ring demodulator circuit, a tuning circuit including a capacitance and having said fixed frequency applied thereto, a capacitative bridge, a member whose deviation from a null is to be sensed adapted to unbalance said bridge in accordance with said deviation, said bridge connected in parallel with the capacitance of said tuning circuit so as to cause said tuning circuit to resonate when said bridge is unbalanced, a second coupling circuit for applying the output from said bridge to said ring demodulator circuit, output lines from said ring demodulator circuit having a D. C. output signal thereon proportional to the deviation of said member from null.

2. In a deviation signal circuit an oscillator having a reference frequency output, a ring demodulator circuit, coupling circuits for applying said reference frequency to said ring demodulator circuit, a frequency determining circuit including a tuning capacitor, a four-terminal capacitance bridge having capacitors in each of two adjacent arms formed of stators cooperating with a common rotor and having fixed capacitors in each of the other arms, a rotating member whose angular deviation from a null is to be sensed, said member adapted to have its rotating motion cause relative motion between said stators and said rotor, said bridge being balanced when said rotating member is at a null position, said bridge connected in parallel with the capacitor of said frequency determining circuit so as to cause said latter circuit to resonate at said reference frequency when said bridge is unbalanced, a second coupling circuit for applying the output from said bridge to said ring demodulator circuit, output lines from said ring demodulator circuit having a D. C. output proportional to the deviation of said rotating member from said null position.

3. In a control system for a gyro having a pick-off for producing an error signal, comprising a crystal oscillator having a reference frequency output, a ring demodulator circuit, coupling circuits for applying said reference frequency to said ring demodulator circuit, a capacitative bridge, said bridge having a connection to said gyro so as to become unbalanced when said gyro rotates about its axis from a null position, a tuning circuit having said reference frequency applied thereto, said tuning circuit including a capacitance set so as not to resonate at said reference frequency, said capacitative bridge connected in parallel with the capacitance of said tuning circuit so as to cause said tuning circuit to resonate when said bridge is unbalanced, a second coupling circuit for applying the output from said bridge to said ring demodulator circuit, output lines from said ring demodulator circuit having a D. C. output proportional to the rotation from null of said gyro about its axis.

4. In a follow up control system for a gyro having a pick-off for producing an error signal, comprising a crystal oscillator having a reference frequency output, a ring demodulator circuit, coupling circuits for applying said reference frequency to said ring demodulator circuit, a capacitative bridge, said bridge having a connection to said gyro so as to become unbalanced when said gyro rotates about its axis from a null position, a tuning circuit having said reference frequency applied thereto, said tuning circuit including a capacitance set so as not to resonate at said reference frequency, said capacitative bridge connected in parallel with the capacitance of said tuning circuit so as to cause said tuning circuit to resonate when said bridge is unbalanced, a second coupling circuit for applying the output from said bridge to said ring demodulator circuit, output lines from said ring demodulator circuit having a D. C. output proportional to the rotation from null of said gyro about its axis, an A. C. power supply, a modulator for controlling said A. C. supply in accordance with said D. C. signal, a motor energized by said modulated A. C. power supply for rotating said gyro about its axis to return said capacitance bridge to a balanced state.

5. A deviation sensing circuit comprising an oscillator having a reference frequency output, a reference and signal tuning circuit each having a coil and a capacitor, a link coupling circuit for transmitting said reference frequency in parallel to both said reference and signal tuning circuits, a reference amplifier for the output from said reference tuning circuit, a four-terminal ring demodulator circuit, a coupling circuit for applying said amplified reference frequency across one pair of diagonally opposite terminals of said ring demodulator circuit, a four-terminal capacitor bridge having fixed capacitors in two adjacent arms and stators in each of the other arms interacting with a common rotor, a first movable member attached to said stators, a second movable member attached to said rotor, the null position of said first member with respect to said second member corresponding to a balanced condition of said bridge, said bridge electrically connected with said stators and said rotor in parallel with said capacitor of said signal tuning circuit, an A. C. signal output from said bridge taken across the terminals of said rotor and the common junction of said fixed capacitors when said bridge is unbalanced due to relative motion of said first and second members, a signal amplifier for said A. C. bridge output signal, a second coupling circuit for applying said amplified A. C. signal across the other pair of diagonally opposite terminals of said ring demodulator, a D. C. signal from said ring demodulator having a sense of polarity dependent on the direction and having a magnitude dependent on the amount of relative motion of said first member and second member.

6. In a deviation signal circuit an oscillator having a reference frequency output, a ring demodulator circuit comprising a four-terminal diode ring having a first diagonal connected to a reference tuned coil and having a second diagonal connected to a signal tuned coil, a reference coupling circuit for applying said reference frequency to said reference tuned coil, a frequency determining circuit including a tuning capacitor, said reference frequency applied across said frequency determining circuit, a four-terminal capacitance bridge having capacitors in each of two adjacent arms formed of stators cooperating with a common rotor and having fixed capacitors in each of the other arms, a first rotating member attached to said stators, a second rotating member attached to said rotor, the null position of said first member with respect to said second member corresponding to a balanced condition of said bridge, said bridge electrically connected with said stators and said rotor in parallel with said capacitor of said frequency determining circuit, an A. C. signal output from said bridge taken across the terminals of said rotor and the common junction of said fixed capacitors when said bridge is unbalanced due to relative rotation of said first and second members, a signal coupling circuit for applying said A. C. signal to said signal tuning coil of said ring demodulator circuit, a pair of output lines from said ring demodulator circuit connected to the center of said reference and signal tuning coils, a D. C. signal output on said output lines proportional to the relative rotation of said first and second members from said null position.

EDWARD S. BAKER.

REFERENCES CITED

The following references are of record in the file of this patent:

UNITED STATES PATENTS

| Number | Name | Date |
|---|---|---|
| 1,970,442 | Wittkuhns et al. | Aug. 14, 1934 |